(12) United States Patent
Ray

(10) Patent No.: US 11,217,889 B2
(45) Date of Patent: Jan. 4, 2022

(54) METHOD TO OPTIMIZE BEAMS FOR PHASED ARRAY ANTENNAS

(71) Applicant: The Boeing Company, Chicago, IL (US)

(72) Inventor: Gary A. Ray, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 365 days.

(21) Appl. No.: 16/539,028

(22) Filed: Aug. 13, 2019

(65) Prior Publication Data
US 2021/0050667 A1  Feb. 18, 2021

(51) Int. Cl.
*H01Q 25/00* (2006.01)
*H01Q 3/26* (2006.01)
*H04B 7/08* (2006.01)

(52) U.S. Cl.
CPC ........... *H01Q 3/267* (2013.01); *H01Q 25/002* (2013.01); *H04B 7/086* (2013.01)

(58) Field of Classification Search
CPC ....... H01Q 3/267; H01Q 25/002; H01Q 25/00
USPC ......................................................... 342/371
See application file for complete search history.

(56) References Cited

U.S. PATENT DOCUMENTS

| | | | |
|---|---|---|---|
| 3,631,503 A | 12/1971 | Tang et al. | |
| 2004/0174300 A1* | 9/2004 | Nakagawa | H04B 7/0837 342/377 |
| 2017/0016979 A1* | 1/2017 | Cho | G01S 13/90 |
| 2017/0310004 A1* | 10/2017 | Swirhun | H01Q 3/28 |
| 2019/0170588 A1* | 6/2019 | Maia Da Silva | H01S 3/0014 |

OTHER PUBLICATIONS

Xiaofeng et al., "Convex Optimization Based Sidelobe Suppression for Adaptive Beamforming with Subarray Partition", ACES Journal, vol. 29, No. 1, Jan. 2014.
Scholnik et al., "Optimal Array-Pattern Synthesis for Wideband Digital Transmit Arrays", IEEE Journal of Selected Topics in Signal Processing, vol. 1, No. 4, Dec. 2007.
Zhu et al., "L-BFGS-B—Fortran subroutines for large scale bound constrained optimization", Northwestern University EECS Technical Report NAM12 (1995).
Fei et al., "Parallel L-BFGS-B algorithm on GPU," Computers & Graphics, vol. 40 (2014), pp. 1-9.

(Continued)

*Primary Examiner* — Harry K Liu
(74) *Attorney, Agent, or Firm* — Ostrager Chong Flaherty & Broitman P.C.

(57) ABSTRACT

Systems and methods for forming optimized transmit or receive beams using an array antenna. A parallelized beam forming algorithm is employed that allows the beam to be optimized to increase performance over typical time-delay beam steering. The parallelized beam forming optimization algorithm is based on a limited-memory Broyden-Fletcher-Goldfarb-Shanno algorithm with bound constraints. Using a matrix form of both the beam and beam gradient functions allows parallel optimization through beam matching against a designed target beam. Because the optimization is both efficient and parallelizable, beams may be optimized beams in real time. Hence the optimization technique may be implemented directly as part of a beam steering controller.

20 Claims, 10 Drawing Sheets

(56) References Cited

OTHER PUBLICATIONS

Azar, "Overlapped Subarrays: Review and Update", IEEE Antennas and Propagation Magazine, vol. 55, No. 2, Apr. 2013, pp. 228-234.
Xiong et al., "On the weighting optimisation of the antenna with overlapped subarrays architecture," IET Microwaves, Antennas & Propagation, 2015, pp. 1-10.
Gergel, "Introduction to Parallel Programming: 7. Parallel Methods for Matrix-Vector Multiplication", University of Nizhni Novgorod (2005).

* cited by examiner

METHOD TO OPTIMIZE BEAMS FOR PHASED ARRAY ANTENNAS

BACKGROUND

The technology disclosed herein generally relates to phased array antennas. In particular, the technology disclosed herein relates to methods for forming beams using a phased array antenna.

Modern phased array antennas are a technology enabler to support mobile broadband communications via satellites, aircraft, ships and land vehicles. In particular, advanced digital beam forming is required to provide dynamic, high-throughput robust communications and networking with larger phased array antennas through improved side lobe performance and grating lobe suppression, faster nulling for jamming, faster scanning and faster beam switching to enhance network performance, all while reducing computational requirements. To meet these needs, not only are sophisticated beam forming algorithms required, but they must be implemented on current programmable processing hardware that allows for both low latency and real-time performance, as well as conveniently allow tailoring of the algorithm to support many different specific array types and applications.

Beam forming is a signal processing technique used in antenna arrays for directional signal transmission or reception. This is achieved by combining signal elements in an antenna array in such a way that signals at particular angles experience constructive interference while others experience destructive interference. These are typically called phased array antennas. The improvement compared with omni-directional reception and/or transmission is known as the directivity of the array and is an important measure of the performance of the antenna. Beam forming can be used for radio-frequency (RF) or sound waves and has many applications in radar, sonar, seismology, wireless communications, radio astronomy, acoustics and biomedicine. Conventional time-delay beam steering takes a pointing direction (referred to herein alternatingly as "angle of the boresight" or "pointing angle") and produces settings on the antenna array so that signal transmission or reception towards the pointing direction is maximized. The mechanism used to effect beam forming is to adjust the phase (or time delay) and amplitude (or weight) separately at each element to force the constructive or destructive signal summation to produce the desired beam. If the signal bandwidth is narrow relative to the frequency, this is the narrowband case and adjusting the phase of the signal is essentially equivalent to adjusting the time delay of the signal at each element. However, if this is not the case, the signal is considered to be wideband and time delay adjustments are necessary.

Existing solutions to real-time beam forming typically use standard time-delay beam steering to produce a single set of element weights and phase delays for a given taper. Thus, there is no real way to adjust to changing conditions by tweaking power in particular directions or creating nulls for interferers. In addition, previous solutions for optimizing beams did not operate in real time and used optimization methods that were slow to execute, even on powerful computers.

SUMMARY

The subject matter disclosed in detail below is directed to systems and methods for forming optimized transmit or receive beams using a phased array antenna. The innovative beam forming technique proposed herein solves the problem of increasing array beam quality in real time without changing the array elements. A parallelized beam forming algorithm is employed that allows the beam to be optimized in real time to increase performance over typical time-delay beam steering. The beam forming technique may be implemented directly in hardware as part of the beam steering controller. In accordance with one embodiment, the method of real-time optimization of array beams uses a highly efficient algorithm and parallel computing architecture provided by a standard graphics processing unit (GPU). Thus, the benefits of both static and dynamic beam optimization may be gained.

In accordance with one proposed implementation, the parallelized beam forming optimization algorithm is based on a limited-memory Broyden-Fletcher-Goldfarb-Shanno algorithm with bound constraints. Using a matrix form of both the beam and beam gradient functions allows parallel optimization through beam matching against a designed target beam. Because the optimization is both efficient and parallelizable, beams may be optimized in real time. The optimization algorithm may be used to increase beam quality in almost all aspects (maximum beam power, side lobe reduction, ripple, frequency response, etc.) over typical time-delay steering depending on the desired optimization.

The innovative technology disclosed herein has the following features: (1) The technique supports optimization across frequency as well as spatially, thus supporting wide-bandwidth phased array antenna systems. (2) Time delay elements may be solved with the same basic approach as with standard narrowband amplitude and phase shifting elements. (3) Emission mask requirements of the Federal Communications Commission (FCC) can be easily incorporated into the beam forming process. (An emission mask is a technical parameter that affects the efficient use of a frequency band by limiting emissions from one channel into adjacent channels. The mask provides technical specifications which limit the distribution of power of a radio transmitter as a function of frequency.) (4) Overlapping subarrays may be incorporated into the design process as well as dead elements. (5) The optimization algorithm may be wrapped with an adaptation structure to replace typical adaptive beam forming methods with an optimized solution to solve problems such as wide-band nulling and side lobe improvements even during adaptation. (6) Moving from a field-programmable gate array-based (FPGA-based) simple narrow-bandwidth beam steering algorithm to a high-quality optimization within a GPU allows usage of floating point arithmetic and easy programming.

Although various embodiments of systems and methods for forming optimized transmit or receive beams using a phased array antenna will be described in some detail below, one or more of those embodiments may be characterized by one or more of the following aspects.

One aspect of the subject matter disclosed in some detail below is a method for forming optimized beams using a phased array antenna, the method comprising: (a) computing complex coefficients for forming a beam having a beam pattern using a parallelized constrained optimization algorithm to minimize a sum of a squared error between the beam pattern and a target beam pattern having a desired pointing direction and beam power; and (b) controlling elements of a phased array antenna to apply the complex coefficients to signals for forming the beam having the beam pattern, wherein the complex coefficients include weights and phase values for elements of the phased array antenna.

In accordance with one embodiment of the method described in the immediately preceding paragraph, the parallelized constrained optimization algorithm is a limited-memory Broyden-Fletcher-Goldfarb-Shanno algorithm with bound constraints. The limited-memory Broyden-Fletcher-Goldfarb-Shanno algorithm comprises beam and beam gradient functions in matrix form to enable parallel processing. The parallel processing is performed by a processing unit that used floating point arithmetic.

Another aspect of the subject matter disclosed in some detail below is a phased array antenna system comprising: a phased array antenna comprising a multiplicity of elements; a transmitter/receiver system operatively coupled to the phased array antenna; and a beam steering controller comprising a beamforming processor configured to perform operations comprising: (a) computing complex coefficients for forming a beam having a beam pattern using a parallelized constrained optimization algorithm to minimize a sum of a squared error between the beam pattern and a target beam pattern having a desired pointing direction and beam power; and (b) controlling the elements of the phased array antenna to apply the complex coefficients to signals for forming the beam having the beam pattern, wherein the complex coefficients include weights and phase values for elements of the phased array antenna.

In accordance with one embodiment of the phased array antenna system described in the immediately preceding paragraph, operations (a) and (b) are implemented by the beam steering controller in real time. The phased array antenna comprises a first level consisting of a multiplicity of subarray elements and a second level consisting of a multiplicity of super array elements, the complex coefficients being applied at the subarray elements and super array elements of the phased array antenna.

A further aspect of the subject matter disclosed below is a beam steering controller comprising a beamforming processor configured to perform operations comprising: (a) computing complex coefficients for forming a beam having a beam pattern using a parallelized constrained optimization algorithm to minimize a sum of a squared error between a beam pattern and a target beam pattern having a desired pointing direction and beam power; and (b) controlling elements of a phased array antenna to apply the complex coefficients to signals for forming the beam having the beam pattern, wherein the complex coefficients include weights and phase values for elements of the phased array antenna. The parallelized constrained optimization algorithm is a limited-memory Broyden-Fletcher-Goldfarb-Shanno algorithm with bound constraints. The beam steering controller further comprises a plurality of interfaces and an interface processor communicatively coupled to the beamforming processor and to the plurality of interfaces. In accordance with one proposed implementation, the beamforming processor is a graphics processing unit and the interface processor is a field-programmable gate array.

Other aspects of systems and methods for forming optimized transmit or receive beams using a phased array antenna are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects.

Reference will hereinafter be made to the drawings in which similar elements in different drawings bear the same reference numerals.

DETAILED DESCRIPTION

Illustrative embodiments of systems and methods for forming optimized transmit or receive beams using a phased array antenna are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

One example embodiment of a method for forming optimized transmit or receive beams using a phased array antenna will be described in some detail below for the purpose of illustration. To clarify the terminology used in this detailed description, first the principle of operation of a phased array antenna will be briefly described with reference to FIG. 1.

Figure 1:
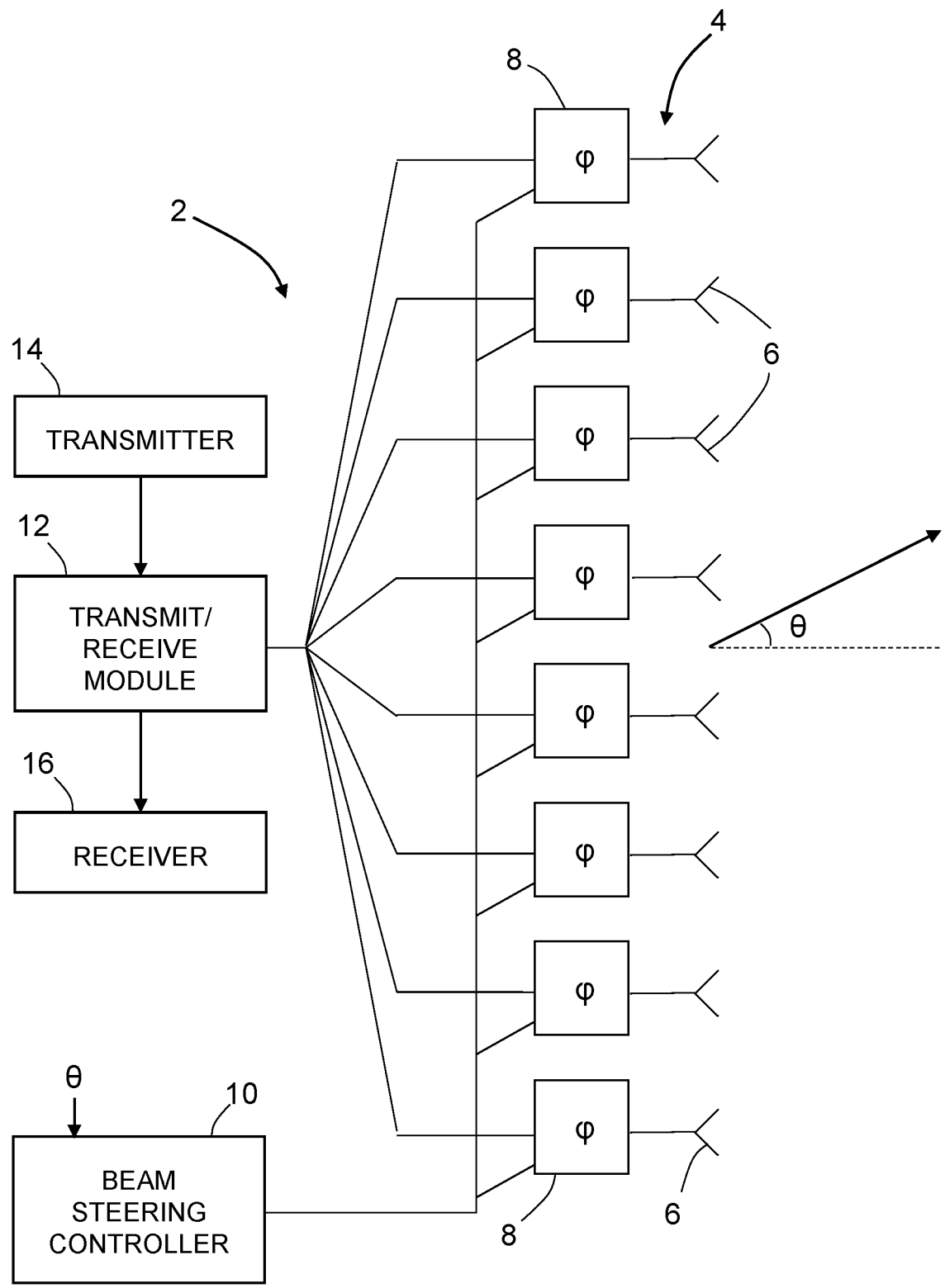
FIG. 1 is a diagram identifying some components of a typical phased array antenna system.

FIG. 1 is a block diagram identifying some components of a typical phased array antenna system 2. The phased array antenna system 2 includes a phased array antenna 4, a transmitter 14, a receiver 16, and a transmit module 12 that connects the transmitter 14 to the phased array antenna 4 in a transmit mode and that connects the receiver 16 to the phased array antenna 4 in a receive mode. The phased array antenna 4 includes an array of antenna elements 6 and a corresponding array of phase shifters 8. The feed current for each antenna element 6 passes through a respective phase shifter 8 (φ) controlled by a beam steering controller 10. The beam steering controller 10 is a computer configured (e.g., programmed) to control the phase shifters 8 in a manner such that the antenna elements 6 emit respective radiofrequency (RF) waves that combine to produce a transmit beam having a pointing angle θ. The individual wavefronts are spherical, but they combine (superpose) in front of the phased array antenna 4 to create a plane wave travelling in a specific direction. The phase shifters 8 delay the RF waves so that each antenna element 6 emits its wavefront later than the antenna element before it. This causes the resulting plane wave to be directed at an angle θ to the antenna's axis (a.k.a. boresight). By changing the phase shifts, the beam steering controller 10 can instantly change the angle θ of the transmit beam. Most phased arrays have two-dimensional arrays of antenna elements instead of the linear array shown in FIG. 1, in which cases the transmit beam can be steered in two dimensions. The receive beam is similarly formed by controlling the phase shifts to combine wavefronts returning from the pointing angle.

In telecommunications and radar engineering, antenna boresight is the axis of maximum gain (maximum radiated power) of a directional antenna. For most antennas the boresight is the axis of symmetry of the antenna. For example, for axial-fed dish antennas, the antenna boresight is the axis of symmetry of the parabolic dish, and the antenna radiation pattern (the main lobe) is symmetrical about the boresight axis. Phased array antennas can electronically steer the transmit beam, changing the angle of the boresight (a.k.a. pointing angle) by shifting the relative phase of the RF waves emitted by different antenna elements 6. As used herein, the term "beamwidth" means the angle between the half-power (−3 dB) points of the main lobe, when referenced to the peak effective radiated power of the main lobe.

This disclosure presents an approach to develop high-quality beam steering using a parallelized optimizing methodology and computing architecture that allows for both real-time operation and beam quality improvement under a wide variety of conditions. Heretofore optimization was an offline methodology to enhance beam quality for fixed beams. The approach adopted herein allows both real-time and adaptive improvements to beam quality through greater efficiency.

In accordance with one embodiment, the algorithm for beam forming is based on a limited-memory Broyden-Fletcher-Goldfarb-Shanno algorithm with bound constraints (hereinafter "L-BFGS-B algorithm"). Using a matrix form of both the beam and beam gradient functions allows parallel optimization through beam matching against a designed target beam. Because the optimization is both efficient and parallelizable, the disclosed methodology is capable of optimizing beams in real time and hence can be implemented directly as part of a beam steering controller. The approach may increase beam quality in almost all aspects (maximum beam power, sidelobe reduction, ripple, frequency response, etc.) over traditional time-delay steering depending on the desired optimization. A beam formation rate of 10-1000 Hz is possible using commercially available GPUs depending on the array size, whereas at least some other methods require many seconds for optimization of large arrays.

The approach proposed herein brings several advantages to traditional time-delay steered beam forming, including the following: (1) The technique supports optimization across frequency as well as spatially, thus supporting wide-bandwidth phased array antenna systems. (2) Time delay elements may be solved with the same basic approach as with standard narrowband amplitude and phase shifting elements. (3) Emission mask requirements of the Federal Communications Commission (FCC) can be easily incorporated into the beam forming process. (4) Overlapping sub-arrays may be incorporated into the design process as well as dead elements. (5) The optimization algorithm may be wrapped with an adaptation structure to replace typical adaptive beam forming methods with an optimized solution to solve problems such as wide-band nulling and side lobe improvements even during adaptation. (6) Moving from an FPGA-based simple narrow-bandwidth beam steering algorithm to a high-quality optimization within a GPU allows usage of floating point arithmetic and easy programming.

In accordance with one proposed implementation, the parallelized beam forming optimization algorithm is based on a limited-memory Broyden-Fletcher-Goldfarb-Shanno algorithm with bound constraints (hereinafter "L-BFGS-B algorithm"). The L-BFGS-B algorithm is an iterative algorithm. After initialization, with a starting point and bound constraints, the L-BFGS-B algorithm iterates through five phases: (1) gradient projection; (2) generalized Cauchy point calculation; (3) subspace minimization; (4) line searching; and (5) limited-memory Hessian approximation.

The L-BFGS-B algorithm is a high-quality optimization algorithm that is able to quickly solve thousands of variables with minimal memory and can be used to optimize many aspects of the formed beam, including direction, width, side lobes, ripple, etc. The number of iterations is largely independent of the number of variables and typically varies between 10 and 100. Thus, by clamping a maximum iteration count, this algorithm can be used for real-time operation. Handling bounds allows for specification of phase and delay ranges for element control as well as meeting FCC mask or other interference specifications. Regularization terms can be introduced into the minimization function to control beam aspects, such as beam width, side lobes, grating lobes, nulls for interference cancellation. The beam pattern and regularization terms and their gradients can be exactly specified and implemented in a known parallel fashion.

The purpose of the L-BFGS-B algorithm is to minimize a nonlinear function $f(x)$ (also referred to herein as the "objective function" and the "target function"), where x is an n-dimensional vector subject to box constraints $l \leq x \leq u$, where the vectors l and u represent lower and upper bounds on x. The gradient $g(x)$ must be known, but the Hessian matrix of the objective function $f(x)$ is not required. At each iteration, a limited-memory BFGS approximation to the Hessian matrix is updated using a stored set of m states. This limited-memory matrix is then used to define a quadratic model of the objective function $f(x)$. A search direction is then computed using two steps: (1) the gradient projection method is used to identify a set of active variables (variables that will be held at their bounds) and the quadratic model is approximately minimized with respect to the free variables, and (2) a line search is performed along this minimizing direction to find the Cauchy point. Assuming that the number m of stored states is in a range $3 \leq m \leq 20$, the minimum and maximum numbers of operations (e.g., multiplications) per iteration for the L-BFGS-B algorithm are $4mn+n$ and $m^2 n$ respectively.

Parallelization for the L-BFGS-B algorithm has been challenging since there is a strong data dependency in some key steps, including the generalized Cauchy point calculation, subspace minimization and line searching. This disclosure describes how to compute the target function and gradient in parallel for beam forming. Since in the case of beam forming, the gradient computation dominates the overall optimization time, this parallelization ensures that a parallel L-BFGS-B optimization is highly efficient and can achieve improvement by a factor of in a range of 100 to 1,000 using high-performance GPUs (which may have approximately 4,000 compute elements or more).

In order to parallelize the objective function and gradient for rapid evaluation, they must be written in a form that can be easily parallelized. The objective function can be tailored to the particular beam optimization required. What will be described hereinafter is the general beam matching optimization, which is flexible and covers a number of applications. But many other optimization functions are possible. The beam matching objective function can be written in the form $$\|Ax-b\|_2 = (x^H A^H - b^H)(Ax-b)$$

Here $(\bullet)^H$ is the Hermitian operation which is a conjugate transpose operation on a matrix or vector. This can be used to minimize the sum of squared error between a "beam pattern" $Ax$ for matrix $A_{M \times N}$, vector $x_{N \times 1}$ and a target beam pattern $b_{N \times 1}$. A more general form can also add an importance weighting to the difference for each direction by adding a diagonal matrix of the form:

$$x^H A^H - b^H) \text{diag}(V)(Ax-b)$$

where V is a vector of "importance weights" that can be used to emphasize or deemphasize the error in any particular direction. In what follows, for simplicity, directions will be equally weighted, but everything can be modified easily to accommodate unequal weighting.

Figure 2:
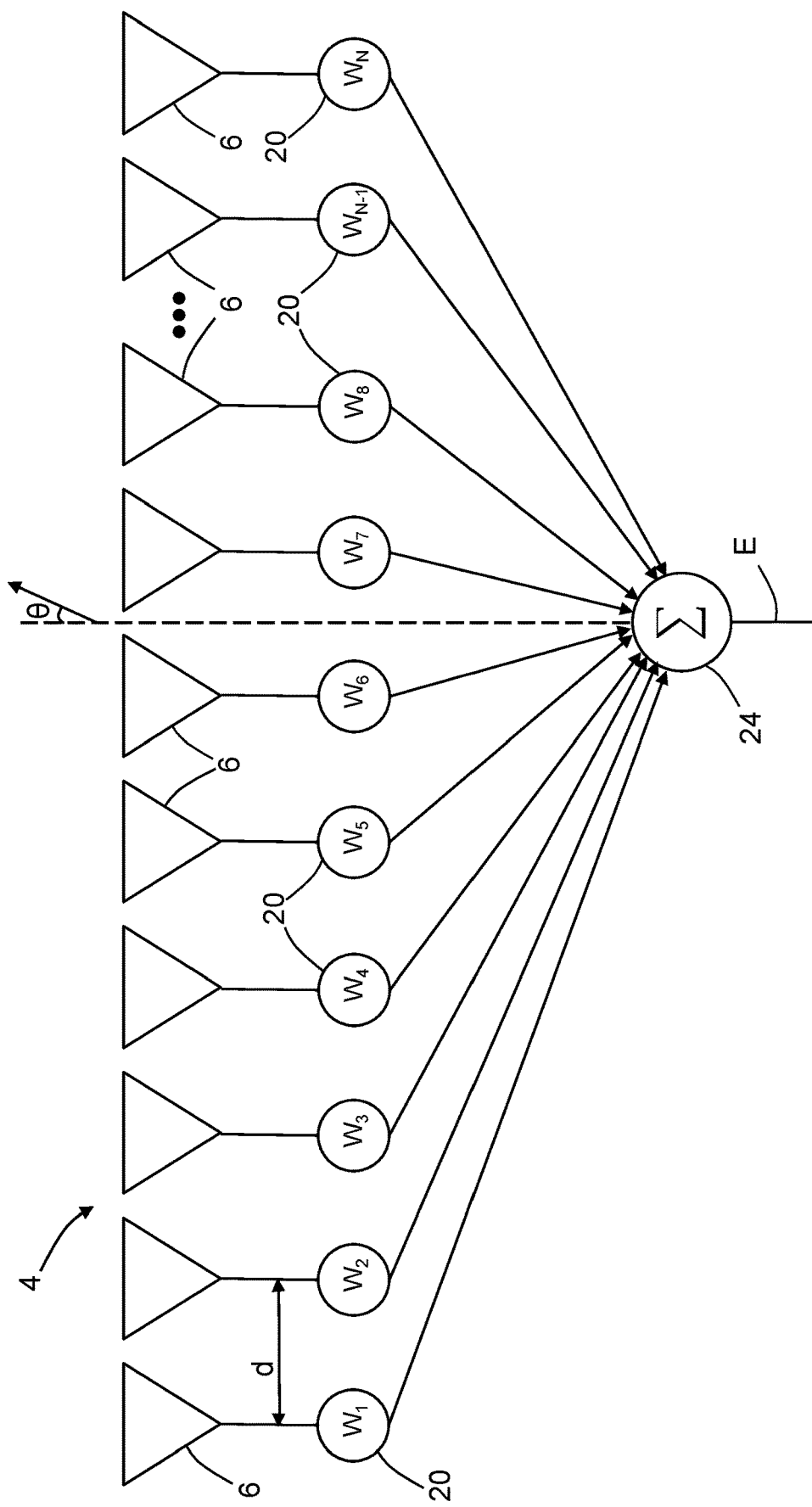
FIG. 2 is a diagram identifying some elements of a uniform linear array antenna.

Consider the calculation of the pattern E of a uniform linear array antenna 4 having N antenna elements 6 and associated phase shifters 20 having complex coefficients $W_0$ through $W_N$ which weight and phase shift the respective signals received by antenna elements 6, as shown in FIG. 2. The phase-shifted signals are summed by a summer 23 to produce the radiation pattern E. The calculation uses the value $u = \sin\theta$, where $\theta$ is the beam direction from boresight and the zero phase reference is at the center of the array. The radiation pattern for the total array with N elements is given by $$E = \sum_{i=1}^{N} W_i^* f_i(u) \exp\left(j \frac{2\pi i du}{\lambda} - j \frac{\pi(N+1)du}{\lambda}\right)$$

where the (complex) coefficient $W_i$ includes the weight and phase value for the i-th element and $f_i(u)$ is the i-th element radiation pattern. Here $\lambda$ is the wavelength and d is the distance between elements of the linear array. If the element radiation patterns are identical, the array radiation pattern can be factored into an element factor and an array factor $$E = f(u) \sum_{i=1}^{N} W_i^* \exp\left(j \frac{2\pi i du}{\lambda} - j \frac{\pi(N+1)du}{\lambda}\right) = f(u)H(u).$$

Assume that the element radiation pattern is isotropic and is not included in what follows for simplicity, but could be easily added. By defining $$A_\theta = \left[\exp\left(j \frac{2\pi i du}{\lambda} - j \frac{\pi(N+1)du}{\lambda}\right)\right]_i$$

$$x = [W_i^*] = [w_i \exp(j\pi\phi_i)]_{i=1}^{N},$$

it is clear that $b = A_\theta x$ forms a beam b with radiated field E pointed at angle $\theta$. Here the definition of x has been separated into real quantities of magnitude and phase. Since actual beam formers use attenuation or gain and phase offset or time delay to define the phase/time shifters for each element, this approach ties the equations to the actual implementation.

The optimization problem for beam matching then chooses a target beam pattern b which incorporates not only the intent to point in a particular direction, but is tweaked to adjust beam power for various purposes, including to close a link or to reduce an interferer. Also, a set of directions can be chosen (and optionally the importance of each direction) to define the beam's overall shape, but not to over-define it (so that optimization is ineffective). This gives the objective function:

$$A = [A_{\theta 1}, A_{\theta 2}, \ldots, A_{\theta M}]_{M \times N}$$

$$\min_x (x^H A^H - b^H)(Ax - b)$$

The gradient is one key to the L-BFGS-B algorithm's speed of convergence (along with its ability to approximate the objective function using fewer variables and incorporation of lower and upper bounds on variables). Since the L-BFGS-B algorithm is a real number-based algorithm, the actual variables must have real values, so in fact the unknown vector of variables to be optimized will consist of $$y = \begin{bmatrix} w_i \\ \phi_i \end{bmatrix}$$

where $$x = y_i \exp(j\pi y_{i+N}):$$

Here the weights can be normalized so that $l_i \le y_i \le u_i$ for i=1, 2, ..., N and $l_i = 0$, $u_i = 1$. Also $l_i \le y_i \le u_i$ for i=N+1, N+2, ..., 2N (the normalized phases) with $l_i = -1$, $u_i = 1$.

The gradient is a vector of derivatives with respect to the 2N real variables $\{y_i\}$. Thus, for i=N+1, N+2, ..., 2N, the gradient with respect to weights can be written in matrix form $$(A^H A)^* \cdot (w \cdot z) + (A^H A x) \cdot z^* - (b^H A) \cdot z^* - (A^H b) \cdot z \quad (1)$$

where the symbol represents the Hadamard elementwise multiplication operation, $w = [y_1, y_2, \ldots, y_N]$ and $z = \exp(j\pi [y_{N+1}, y_{N+2}, \ldots, y_{2N}])$. For i=N+1, N+2, ..., 2N, the gradient with respect to phase can be written in matrix vector form as follows:

$$j\pi((A^H A)^* \cdot (w \cdot z) \cdot (w \cdot z) - (A^H A)(w \cdot z) \cdot (w \cdot z)^* + (b^H A)^* \cdot (w \cdot z)$$
$$* + (A^H b)^* \cdot (w \cdot z)) \quad (2)$$

Together these form a 2N×1 real vector denoting the gradient with respect to the real optimization vector y of length 2N.

To parallelize these computations, standard matrix vector parallelization techniques can be used. In short, a vector times a vector of length N can be implemented with N multipliers in parallel and a parallel summing tree, while elementwise multiplication is performed by N multipliers in parallel. Matrix vector multiplication has a number of options which are described by Gergel in: "Introduction to Parallel Programming: 7. Parallel Methods for Matrix-Vector Multiplication", University of Nizhni Novgorod (2005). For example, the Columnwise Data Decomposition mentioned in Section 7.7 of the Gergel reference shows near 100% efficiency in parallel speedup.

In the alternative, a logarithm objective function can be used, especially when optimizing side lobes. In that case the objective function is $$\log(\|Ax-b\|_2)$$

and the gradient is simply $1/\|Ax-b\|_2$ times the previous gradient. Thus, it also is in matrix vector form and its computation can be parallelized.

Standard beam forming is with respect to a particular frequency. Thus, for narrowband operation, the beam points in the correct direction at that frequency. However, for wideband operation, a beam must point in the desired direction for the entire frequency band. This necessitates an optimization that can adjust the beam profile across frequency. To see how this works, assume a uniformly spaced linear array (ULA) has M elements with weights $\{a_m\}$, and $f_m(\theta)$ is the electric field of the m-th radiator, $\beta$ is the progressive phase shift, k is the free space wave number, and d is the spacing between radiating elements. Then the radiated field is given by $$E = C\frac{e^{-jkr}}{r}\sum_{m=1}^{M} a_m f_m(\theta) e^{j(m-1)(kd\cos(\theta)+\beta)}$$

(see Balanis, Modern Antenna Handbook, John Wiley & Sons, 2008.) The signal time delay when a flat wavefront impacts on the array at an angle of $\theta$ is d cos $\theta$. If the antenna elements are all the same and one lets $\beta=-kd\cos\theta_0$, then the radiated field E becomes $$E = Cf(\theta)\frac{e^{-jkr}}{r}\sum_{m=1}^{M} a_m e^{j(m-1)kd(\cos(\theta)-(\cos(\theta_0)))}$$

where $\theta_0$ is the pointing direction of the beam. This is valid for one frequency $f_0 2\pi/\lambda_0 = 2\pi/f_0/c$. For a different frequency $f_1$, the radiated field E becomes $$E = Cf(\theta)\frac{e^{-jkr}}{r}\sum_{m=1}^{M} a_m e^{2\pi j/c \cdot (m-1)d(f_1 \cos(\theta_1)-f_0\cos(\theta_0))}$$

where c is the speed of light. The squint (a term for the pointing angle error) of the beam from center frequency $f_0$ to the edge frequency $f_1$ is given by:

$$\theta_1 = \cos^{-1}\left(\frac{f_0}{f_1}\cos\theta_0\right)$$

This squint affects wideband operation because a change in frequency will change the peak pointing angle of the beam.

The effect of squint can be demonstrated by computer simulation. For example, the operation of a 24-element array was simulated using a center frequency $f_0$ and an edge frequency $f_1$ which differed by 40%. The results of that simulation were that a 40% change in frequency caused a beam direction change from 100° to 102.5°.

To map the wideband design problem into the beam matching approach proposed herein, one may take the original matrix A originally defined only in terms of $M_1$ angles as $$A = [A_{\theta 1}, A_{\theta 2}, \ldots, A_{\theta M_1}]_{M_1 \times N}$$

and modify the matrix to incorporate multiple frequencies, i.e., wavelengths $\lambda_1, \lambda_2, \ldots, \lambda_{M2}$, to create a $M_1 M_2 \times N$ matrix $$A = [A_{\theta 1, \lambda 1}, A_{\theta 2, \lambda 1}, \ldots, A_{\theta M_1, \lambda 1}, A_{\theta 1, \lambda 2}, A_{\theta 2, \lambda 2}, \ldots$$
$$A_{\theta M_1, \lambda 2}, \ldots, A_{\theta 1, \lambda M_2}, A_{\theta 2, \lambda M_2}, \ldots, A_{\theta M_1, \lambda M_2}]_{M_1 M_2 \times N}$$

Here recall that each element of $A_\theta = A_{\theta, \lambda}$ is defined as $$\exp\left(j\frac{2\pi i du}{\lambda} - j\frac{\pi(N+1)du}{\lambda}\right)$$

and thus is also a function of $\lambda$. The beam target b becomes a complex vector of size $M_1 M_2 \times 1$.

Antenna arrays are formed by nodes (sometimes called phase shifters) that amplify and adjust phase to their incoming signals or outgoing signals. These arrays can be linear or multidimensional and can also be formed out of "subarrays". The mathematics behind the subarray definition of an array (a two-level subarray is used as an example) will now be briefly described.

Figure 3:
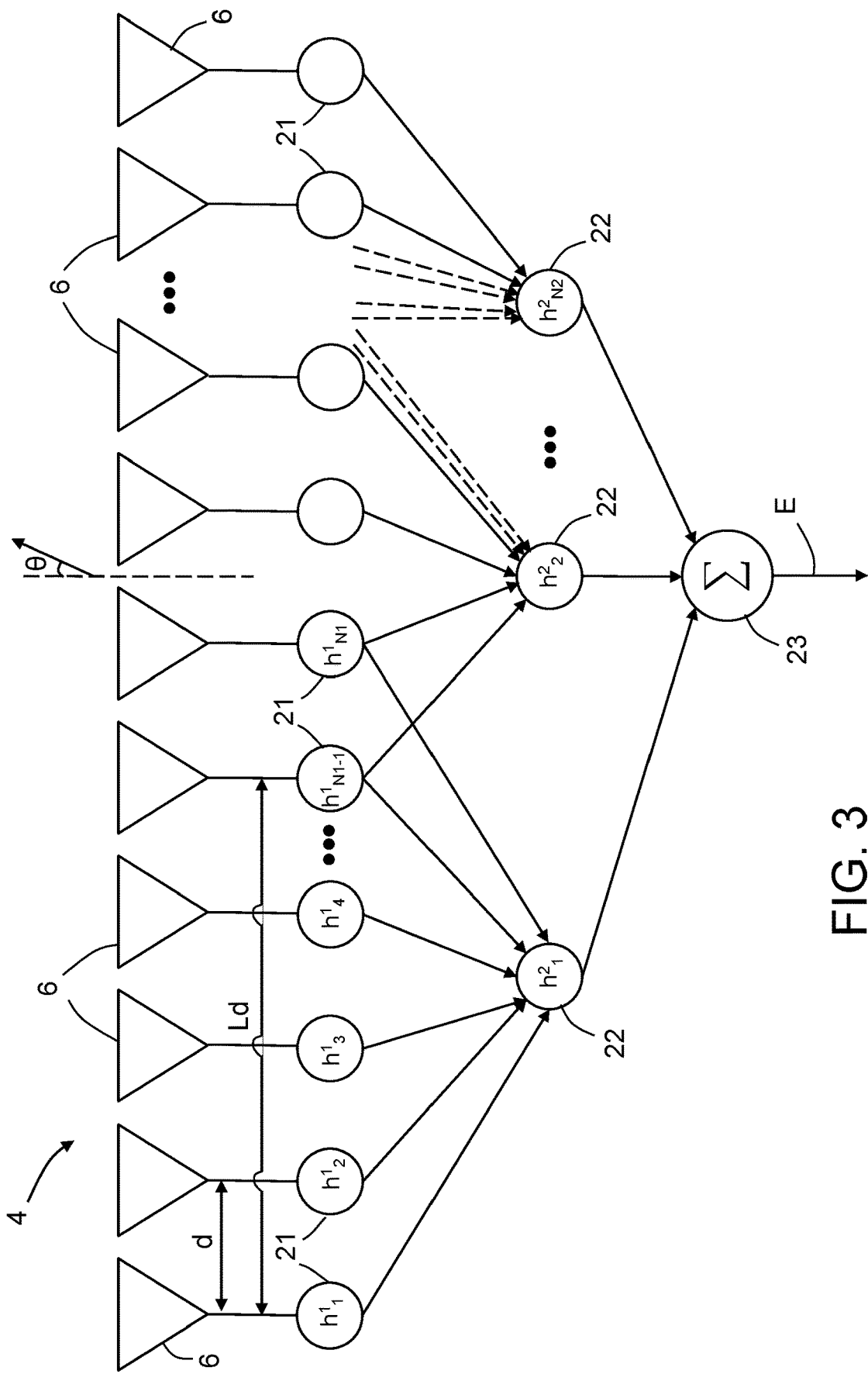
FIG. 3 is a diagram identifying some elements of a linear array with two levels of subarrays.

FIG. 3 is a diagram representing some components of a linear array having a multiplicity of overlapped subarrays which form a super array. Each subarray includes a multiplicity of nodes 21 (hereinafter "subarray elements 21") in the first level that feed signals to nodes 22 (hereinafter "super array elements 22") in the second level. The number of subarray elements 21 in each subarray is $N_1$ and the number of super array elements 22 in the super array is $N_2$. Each subarray element 21 is a node that multiplies a respective received signal by a respective complex weight. The subarrays may be overlapped or non-overlapped. For example, the overlap in FIG. 3 is two subarray elements 21. In the case of overlap, some subarray elements 21 (e.g., the subarray elements 21 in FIG. 3 respectively labeled $h^1_{N1-1}$ and $h^1_{N1}$) can feed more than one super array element 22 (e.g., the super array elements 22 in FIG. 3 respectively labeled $h^2_1$ and $h^2_2$). (Note that superscripts are used in the weight identifiers to distinguish subarray elements 21 and super array elements 22.) In the example depicted in FIG. 3, the subarray elements 21 in the overlap are each connected to a 1:2 divider in order to provide weighted signals to two super array elements 22. In the case of no overlap, each subarray element 21 feeds only one super array element 22.

In the example depicted in FIG. 3, the inter-distance of each subarray is D=Ld, where L+1 is the number of subarray elements exclusive to a single super array element 22 and d is the distance between two adjacent subarray elements 21 (nodes) as shown in FIG. 3. Then, the total number of elements $I=(N_2-1)L+N_1$. The weights arranged in each subarray (i.e., at element level) are designated by $$h^1 = \{h_1^1, \ldots, h_{N1}^1\},$$

while the super array weights added at the combiner of each subarray are designated by $$h^2 = \{h_1^2, \ldots, h_{N2}^2\}.$$

The array factor can be factored into two pieces, one associated with each identical subarray and one that is associated with the super array that ties together the subarrays. In particular, $$H(u) = H_1(u)H_2(u)$$

where $$H^1(u) = \sum_{n=1}^{N_1} h_n^{1*} \exp\left( j\frac{2\pi n du}{\lambda} - j\frac{\pi(N+1)du}{\lambda} \right)$$

$$H^2(u) = \sum_{m=1}^{N_2} h_m^{2*} \exp\left( j\frac{2\pi m Du}{\lambda} - j\frac{\pi(M+1)Du}{\lambda} \right)$$

If $a^1(u)$ and $a^2(u)$ are the steering vectors for the subarray and super array, then these patterns can be written as $$H^1(u) = (h^1)^H a^1(u)$$

$$H^2(u) = (h^2)^H a^2(u)$$

Here the steering vectors are defined as $$a^1(u) = \left[ \exp\left( j\frac{2\pi n du}{\lambda} - j\frac{\pi(N+1)du}{\lambda} \right) \right]_{n=1,\ldots,N_1}$$

$$a^2(u) = \left[ \exp\left( j\frac{2\pi m Du}{\lambda} - j\frac{\pi(M+1)Du}{\lambda} \right) \right]_{m=1,\ldots,N_2}.$$

Thus, there are $N_1+N_2$ unknown magnitude/phase settings for the entire array consisting of the unknown complex weights $$\{h_1^1, \ldots, h_1^2 \ldots\},$$

each defined by real weights $w^1$ and $w^2$ and real phases $\phi^1$ and $\phi^2$. The objective function would minimize $$\|H(u)-b\|^2$$

with a gradient that can be determined as follows using the chain rule:

$$\frac{\partial H}{\partial w^1} = \frac{\partial H}{\partial H^1}\frac{\partial H^1}{\partial w^1}$$

$$\frac{\partial H}{\partial w^2} = \frac{\partial H}{\partial H^2}\frac{\partial H^2}{\partial w^2}$$

$$\frac{\partial H}{\partial \phi^1} = \frac{\partial H}{\partial H^1}\frac{\partial H^1}{\partial \phi^1}$$

$$\frac{\partial H}{\partial \phi^2} = \frac{\partial H}{\partial H^2}\frac{\partial H^2}{\partial \phi^2}$$

The end factor is the basic gradient computation listed in Eqs. (1) and (2) above.

Suppose that each of the first level of subarrays overlaps as shown in FIG. 3. The mathematical description of this type of array factor is more complicated than simply a product of a subarray and super array (due to the interdependencies of the elements). However, it is a complex matrix and the corresponding gradient can be put in matrix-vector form and parallelized as described above.

While a typical beam steering controller using standard time (or phase) delay beam steering can use a simple FPGA implementation, the L-BFGS-B algorithm is more complex and requires floating point operations. Hence the L-BFGS-B algorithm needs to have a high performance and highly parallel compute engine as its basis. In order to implement the L-BFGS-B algorithm adapted to beam optimization into a standard beam steering controller as part of an array system, the system proposed herein employs a GPU as the optimization processor in order to achieve the required beam formation-per-second performance.

Figure 4:
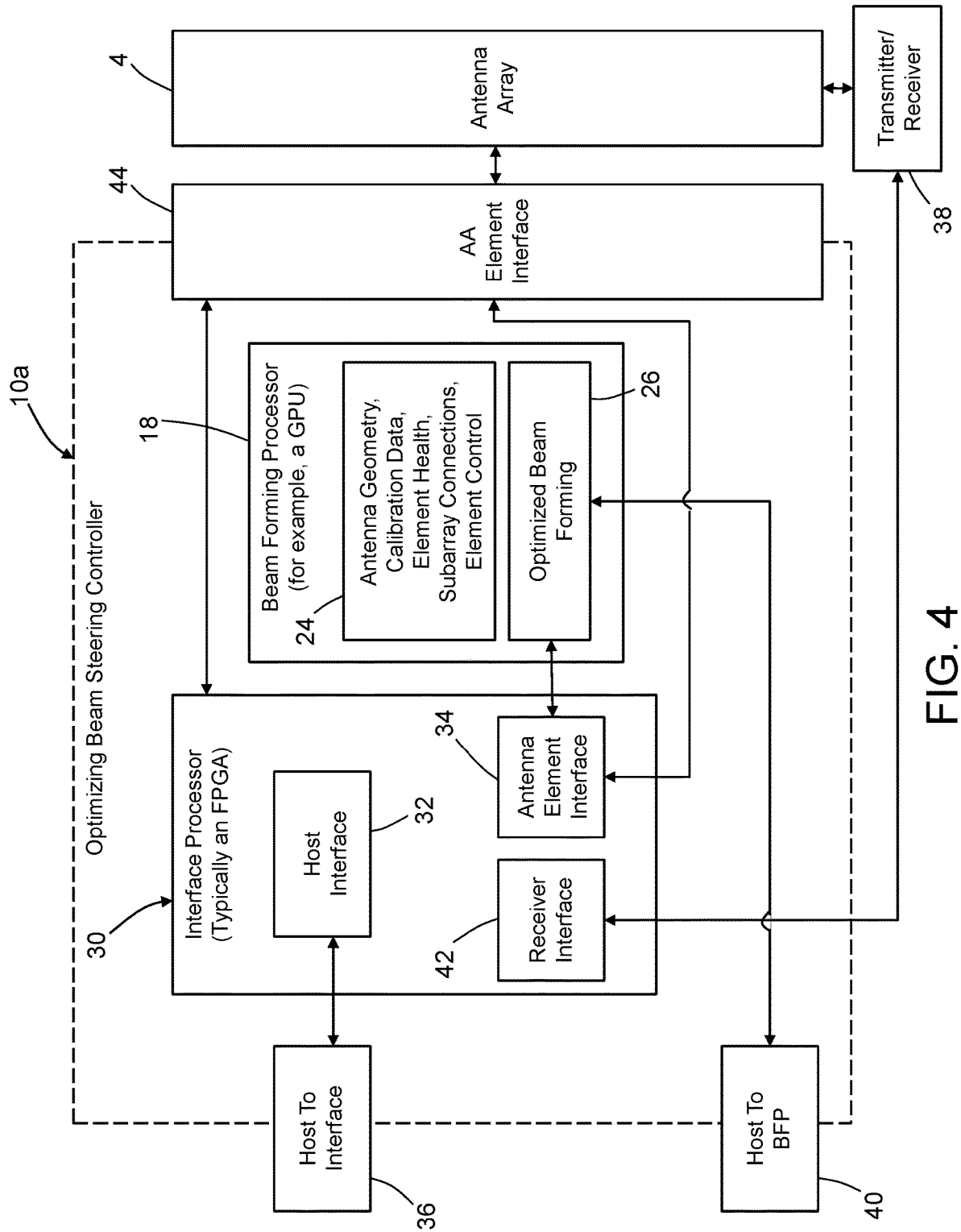
FIG. 4 is a block diagram identifying some components of a phased array antenna system that includes an optimizing beam steering controller in accordance with one embodiment.

FIG. 4 is a block diagram identifying some components of a phased array antenna system that includes an optimizing beam steering controller 10a in accordance with one embodiment. The optimizing beam steering controller 10a includes a beam forming processor 18 (e.g., a GPU) and an interface processor 30 (typically an FPGA). Thus, FIG. 4 shows how an FPGA and a GPU may be used together to accomplish beam steering control by merging their respective strengths.

Referring to FIG. 4, the optimizing beam steering controller 10a further includes a host-to-interface connection 36, which connects the interface processor 30 to a host computer (not shown). The host computer provides overall control of the communications system that uses the antenna array. This interface could be Ethernet or any other standard computer interface. The host computer would be part of the overall communications system that receives and transmits information to satellites, other platforms, ground systems, vehicles and any other entities being communicated with and is outside of the direct concern in this disclosure that specifically has to do with steering the beam of an antenna array. The optimizing beam steering controller 10a further includes a host-to-beam forming processor (BFP) connection 40 (hereinafter "host-to-BFP connection 40"), which connects the host computer to the beam forming processor 18. When the beam forming processor 18 is a GPU, the host-to-BFP connection 40 is typically multiple lanes of a Peripheral Component Interconnect Express connection, which is a high-speed serial computer expansion bus standard. The optimizing beam steering controller 10a further includes an antenna array element interface 44 that sends and receives information to and from the elements of the phased array antenna 4.

Still referring to FIG. 4, the interface processor 30 provides interfaces to several hardware elements within the antenna array subsystem. Specifically, the interface processor 30 includes a host interface 32 that sends and receives information to and from the host computer via the host-to-interface connection 36. The interface processor 30 also includes an antenna element interface 34 that sends and receives information indirectly to and from the phased array antenna 4 via the antenna array element interface 44 and directly to and from an optimized beam forming module 26 in the beam forming processor 18. The interface processor 30 further includes a receiver interface 42 that sends and receives information to and from a transmitter/receiver system 38 that is operatively coupled to the phased array antenna 4. (For example, the transmitter/receiver system 38 may include a transmit/receive module 12, a transmitter 14 and a receiver 16 as shown in FIG. 1.) Typically, the interface processor 30 is implemented as an FPGA. The functions of the interface processor 30 include execution of commands from the host computer, reception of optimized beam information from the beam forming processor 18, and transmission of digital amplitude and phase values to each element of the phased array antenna 4 via the antenna array element interface 44. The antenna array element interface 44 connects the interface processor 30 to each antenna element phase shifter so that the beam pointing can be controlled. The interface processor 30 also sends and receives control and status signals to and from the transmitter/receiver system 38 via the receiver interface 42.

The beam forming processor 18 includes an optimizing beam forming module 26 (also referred to here as an "optimizer") that is configured (e.g., programmed) to compute optimized antenna weights corresponding to commanded beam patterns and constraints given by the host computer. The optimizing beam forming module 26 sends the weights to the antenna element interface 34 of the interface processor 30. The beam forming processor 18 uses various types of data (stored in a non-transitory tangible computer-readable storage medium 24) concerning the antenna, including the following: antenna geometry—the locations of each antenna phase center; calibration data—the calibration data used to modify the phase control settings due to non-ideal operation; element health—the health status of each phase shifter and antenna element (for example, the element health data may be used to modify the beam pattern to accommodate dead elements); subarray connections—the exact connections between antenna elements and the formed beams (this information is used to define the beam function for optimization and beam gradient); and element control—the particulars of the control of the element through phase and amplitude (e.g., detailing the number of bits and types of control and also controlling the final beam function for optimization and beam gradient). In accordance with one proposed implementation, the beam forming processor 18 is a GPU to take advantage of the enhanced GPU processing capability.

Beam power adjustment optimization was simulated with increasing array sizes (increasing powers of two). More specifically, the number N of elements in each simulated array varied from $2^3$=8 to $2^{14}$=16,384. The following table shows the results of timing studies performed for each optimization (beam formation) using a Matlab/C++ version of the L-BFGS-B algorithm. The second column in the table lists the time taken for each optimization (beam formation).

| N | Time | BPS | Mid-range GPU (×100) BPS | High-range GPU (×1000) BPS |
| --- | --- | --- | --- | --- |
| 8 | 0.007485 | 133.60 | 13360.1 | 133600.5 |
| 16 | 0.010149 | 98.53 | 9853.2 | 98531.9 |
| 32 | 0.015696 | 63.71 | 6371.0 | 63710.5 |
| 64 | 0.018507 | 54.03 | 5403.4 | 54033.6 |
| 128 | 0.325776 | 3.07 | 307.0 | 3069.6 |
| 256 | 0.654676 | 1.53 | 152.7 | 1527.5 |
| 512 | 0.453587 | 2.20 | 220.5 | 2204.6 |
| 1024 | 1.493433 | 0.67 | 67.0 | 669.6 |
| 2048 | 3.816139 | 0.26 | 26.2 | 262.0 |
| 4096 | 7.048563 | 0.14 | 14.2 | 141.9 |
| 8192 | 18.252319 | 0.05 | 5.5 | 54.8 |
| 16384 | 42.664884 | 0.02 | 2.3 | 23.4 |

The timing studies showed that between 70% and 99% of the optimization time was used in computation of the beam formation and beam gradient functions. These are highly parallelizable since they are based on basic matrix vector operations. Thus, based on estimates for simulated mid-range and high-range GPU implementations, one may expect beam formations per second (BPS) at very high rates as given in the fourth and fifth columns of the table. This capability will allow beam tracking for a wide variety of array applications.

Figure 5:
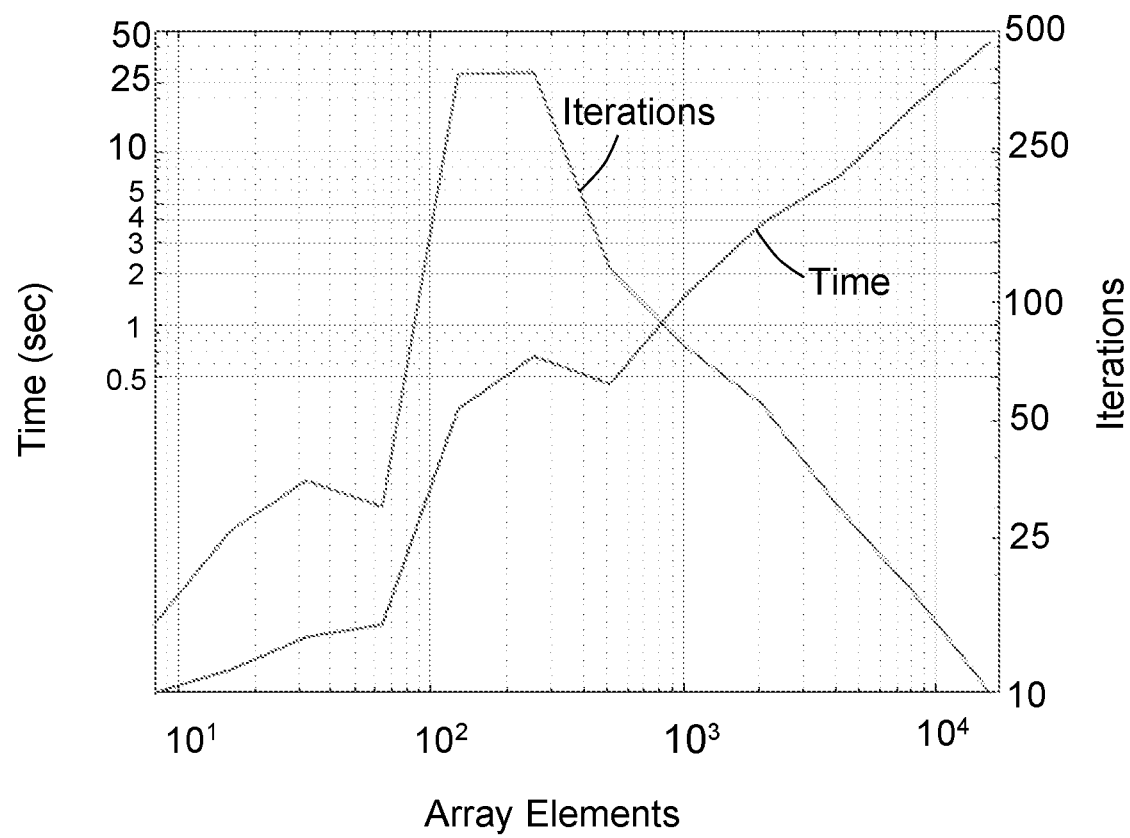
FIG. 5 is a graph showing time (in seconds) and number of iterations versus number of array elements resulting from a computer simulation of L-BFGS-B performance on beam enhancement.

The times for each of these optimization problems are shown in graphical form in FIG. 5, along with the number of iterations required. Note how the number of iterations increases for N=8 to N=128, levels out and decreases from N=256 to N=16,384. This shows the nature of optimization applied to arrays. With small arrays, optimization cannot meet the required beam enhancement and thus stops early. With large arrays, optimization can easily meet the requirements and so a smaller number of iterations are required. In the middle range, the largest number of iterations are required since optimization must work harder in this range, but does eventually succeed.

The simulation results further showed that the compromise in sidelobe performance is slight with N=8, but the beam power enhancement can only achieve 0.2 dB more in gain than with the standard beam forming algorithm. With increasing number of iterations, the sidelobe level becomes worse as the gain increases. When the gain achieved 3 dB (in the target beam used for optimization), the sidelobes went down and then basically matched the original beam pattern at N=256 and above.

Figure 6:
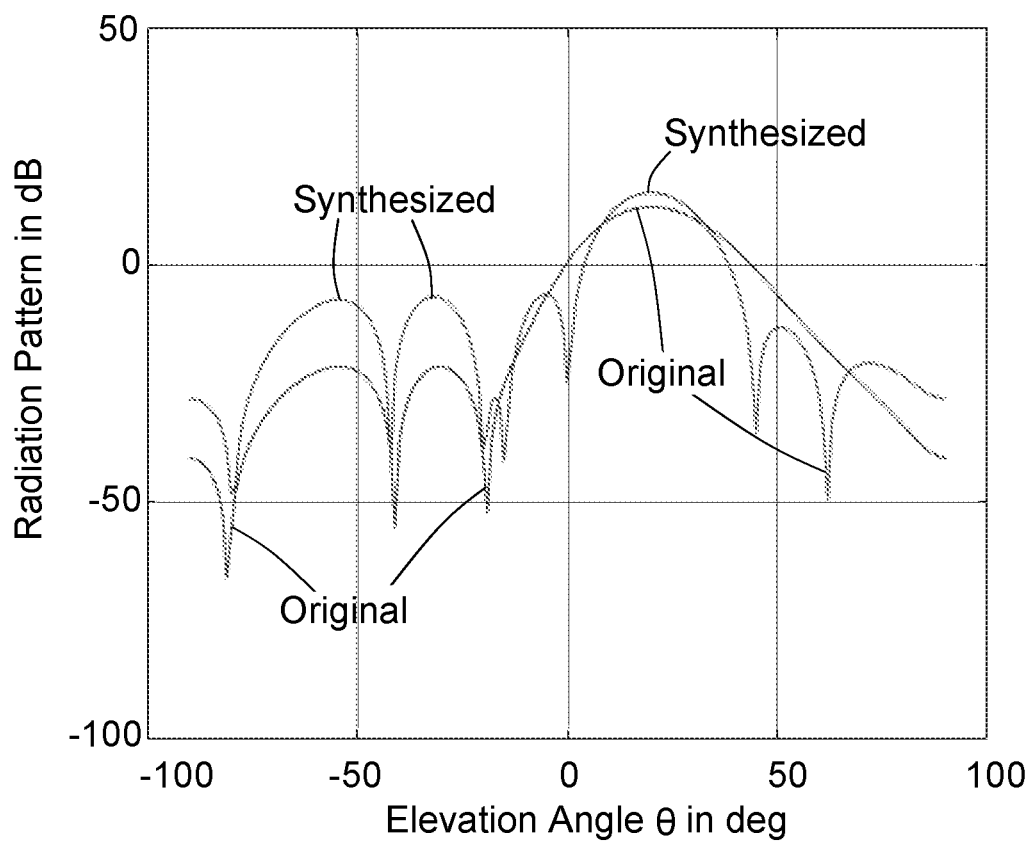
FIG. 6 is a graph of radiation pattern (in dB) versus elevation angle $\theta$ (in degrees) showing the results (curve labeled "Synthesized") of a computer simulation in which a target beam was adjusted using an optimizer to increase the beam power in a pointing direction by 2.5 dB for an 8-element array. The pre-optimized result is shown by the curve labeled "Original".

FIG. 6 is a graph of radiation pattern (in dB) versus elevation angle θ (in degrees) showing the results (curve labeled "Synthesized") of a computer simulation in which a target beam was adjusted using an optimizer to increase the beam power in a pointing direction by 2.5 dB for an 8-element array as adjustments are made in the target beam result. The pre-optimized result is shown by the curve labeled "Original". Here, the beam is pointing at 20° from boresight and the beam power is increased at its pointing angle by a small amount in order to (for example) close the link with another communicating entity such as a satellite. As can be seen, the small number of array elements causes the side lobes to increase as more beam power is allocated to the pointing angle.

Figure 7A:
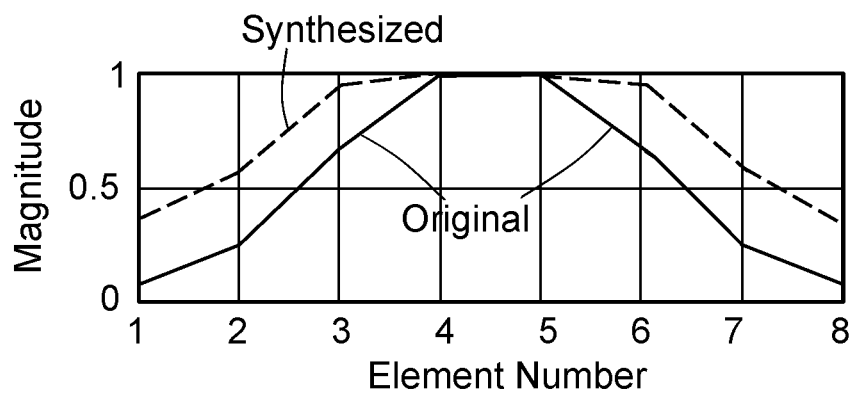
FIGS. 7A and 7B are graphs of magnitude and phase distribution showing the effects that optimization has on the weights and phase shifters of each element of a simulated 8-element array compared to the standard (pre-optimized) beam steering values.
Figure 7B:
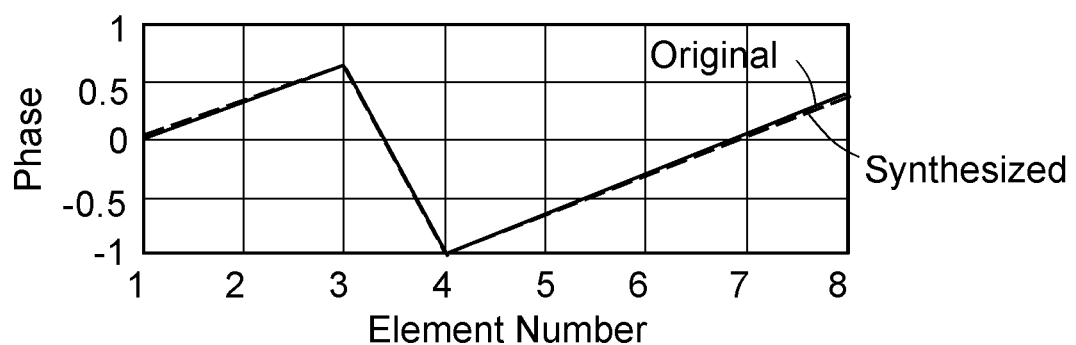

FIGS. 7A and 7B are graphs of magnitude and phase distribution showing the effects that optimization has on the weights and phase shifters of each element of a simulated 8-element array compared to the standard (pre-optimized) beam steering values. The phase shifts have no discernible differences.

Figure 8A:
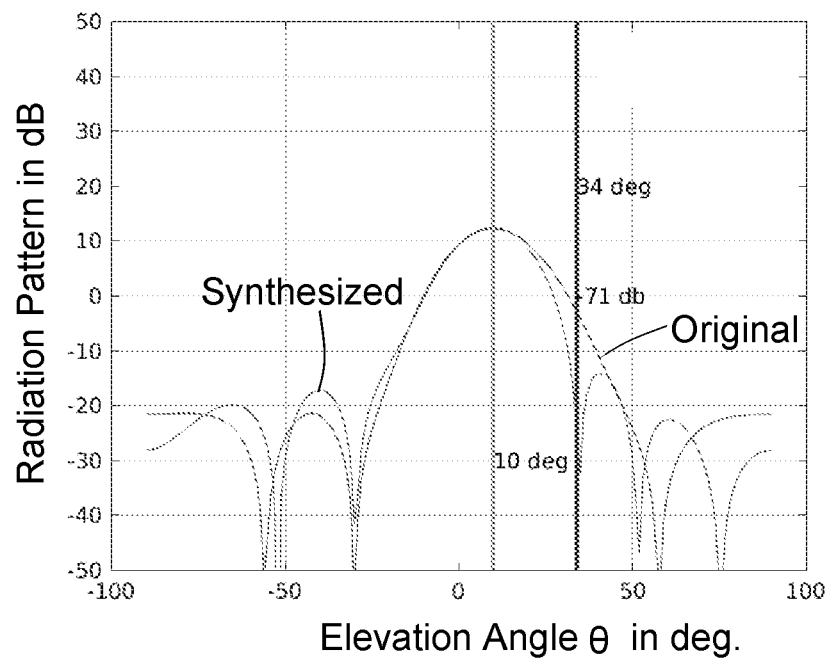
FIGS. 8A through 8F are graphs of radiation pattern (in dB) versus elevation angle $\theta$ (in degrees) showing the results (curve labeled "Synthesized") of a computer simulation in which an optimizer inserted a "null" into a target beam at respective angular positions using beam pattern matching.
Figure 8B:
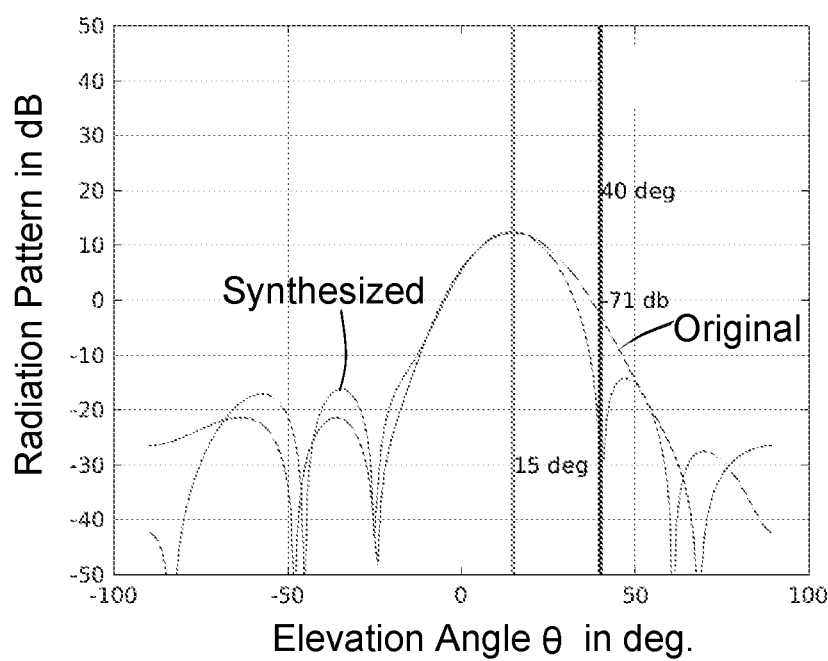
Figure 8C:
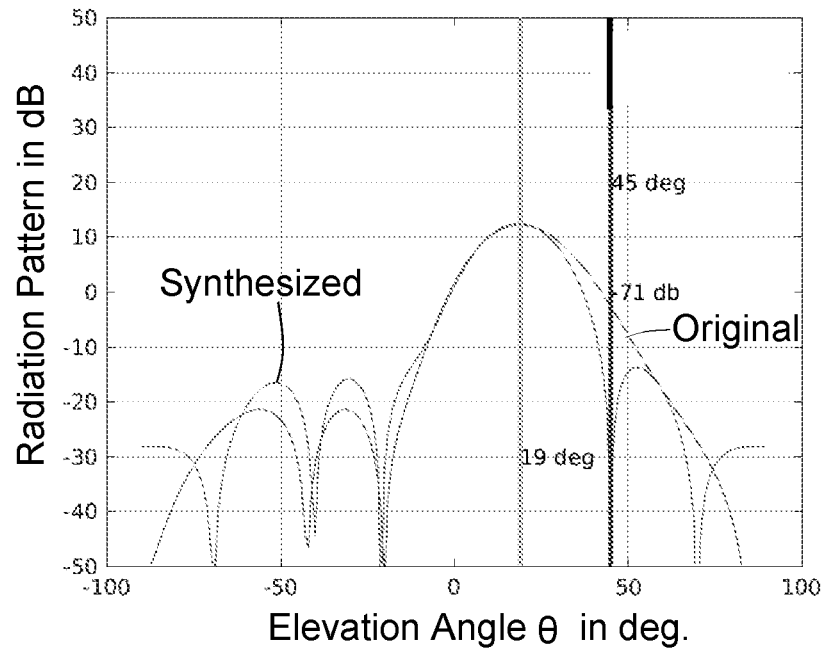
Figure 8D:
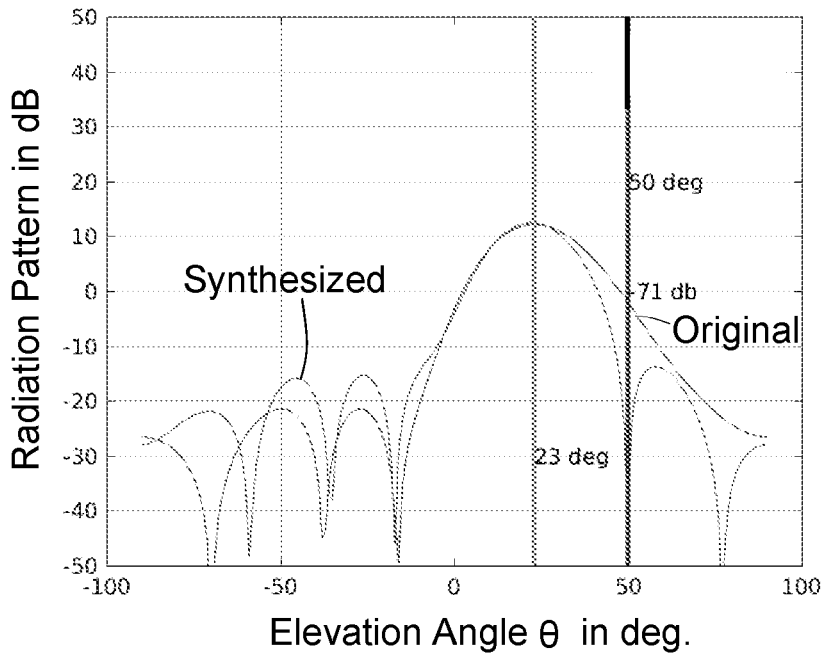
Figure 8E:
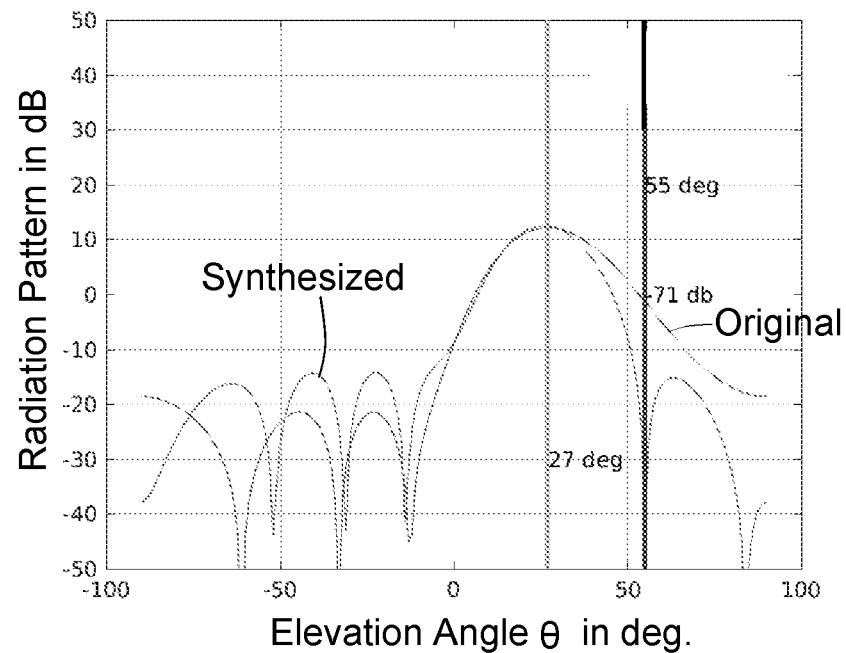
Figure 8F:
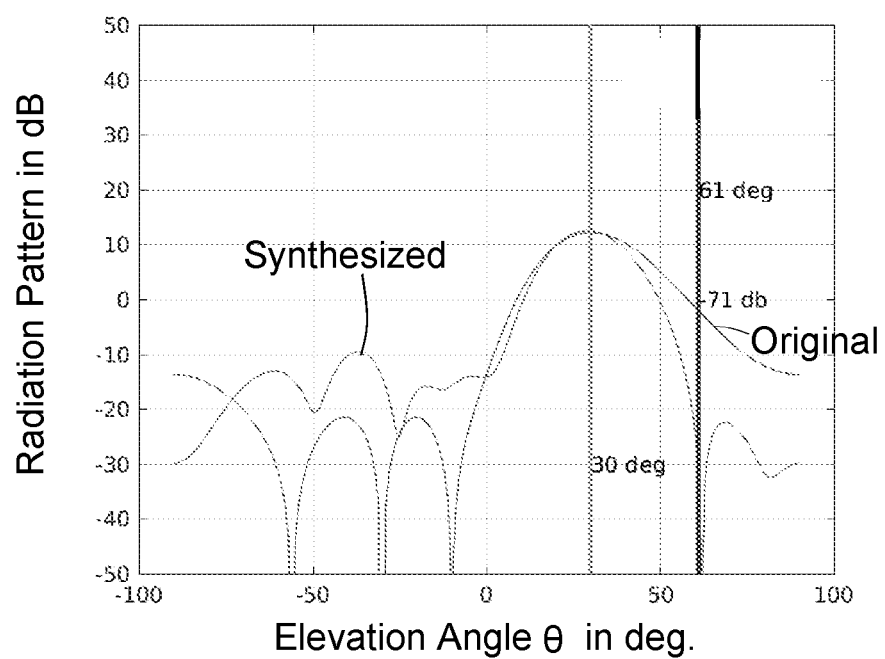

FIGS. 8A through 8F are graphs of radiation pattern (in dB) versus elevation angle θ (in degrees) showing the results (curve labeled "Synthesized") of a computer simulation in which an optimizer inserted a "null" into a target beam at respective angular positions using beam pattern matching. In this case, the log model described previously was used and the target beam pattern for a range of angles is set to zero in order to force a null into a certain angular position at which a simulated interference signal is being received. As seen in FIGS. 8A-8F, the beam is pointing at angles of 10° (FIG. 8A), 15° (FIG. 8B), 19° (FIG. 8C), 23° (FIG. 8D), 27° (FIG. 8E), and 30° (FIG. 8F). The original beams had no null above 20°, while the optimized beams created nulls at various angles of interference incidence of 34° (FIG. 8A), 40° (FIG. 8B), 45° (FIG. 8C), 50° (FIG. 8D), 55° (FIG. 8E), and 61° (FIG. 8F). Thus, a beam steering controller based on this approach could easily deal with interferers at known angles while tracking in real time.

The features described above provide benefits to a phased array antenna system that can be matched to a wide variety of antenna architectures and beam design problems. The technology disclosed herein can solve a wide variety of array problems to address wider signal bandwidths, higher data rates, multiple simultaneous beams, more rapid beam switching, higher gain with more elements and more subarrays, lower side lobes and dynamic low-latency pointing.

These aspects reflect needs in areas such as satellite communications, missile defense and unmanned aircraft systems for intra-platform communications and networking. Specifically, the use of an optimization method implemented on a GPU is more flexible and general than typical time-delay beam steering and will have new performance improvements in many different areas. The method is able to optimize around inactive elements, even out performance across a wide frequency range, and produce better results by adjusting side lobes to meet particular FCC mask requirements or to reduce interference.

The methods described herein may be encoded as executable instructions embodied in a non-transitory tangible computer-readable storage medium, including, without limitation, a storage device and/or a memory device. Such instructions, when executed by a processing device, cause the processing device to perform at least a portion of the methods described herein.

While systems and methods for forming optimized transmit or receive beams using a phased array antenna have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A method for forming optimized beams using a phased array antenna, the method comprising:
   (a) computing complex coefficients for applying weights and phase shifts to signals for forming a beam having a beam pattern, the complex coefficients being computed using a parallelized constrained optimization algorithm to minimize a sum of a squared error between the beam pattern and a target beam pattern having a desired pointing direction and beam power; and
   (b) controlling elements of a phased array antenna to apply the complex coefficients to signals for forming the beam having the beam pattern, wherein the complex coefficients include weights and phase values for elements of the phased array antenna.

2. The method as recited in claim 1, wherein the parallelized constrained optimization algorithm is a limited-memory Broyden-Fletcher-Goldfarb-Shanno algorithm with bound constraints.

3. The method as recited in claim 2, wherein the limited-memory Broyden-Fletcher-Goldfarb-Shanno algorithm comprises beam and beam gradient functions in matrix form to enable parallel processing.

4. The method as recited in claim 3, wherein the parallel processing is performed by a processing unit that uses floating point arithmetic.

5. The method as recited in claim 1, wherein step (a) further comprises computing complex coefficients for adjusting the beam pattern across frequency for wideband operation.

6. The method as recited in claim 1, wherein step (a) further comprises computing complex coefficients for nulling interference signals or closing a link.

7. The method as recited in claim 1, wherein the complex coefficients are applied at subarray elements and super array elements of the phased array antenna.

8. A phased array antenna system comprising:
   a phased array antenna comprising a multiplicity of elements;
   a transmitter/receiver system operatively coupled to the phased array antenna; and
   a beam steering controller comprising a beamforming processor configured to perform operations comprising:
   (a) computing complex coefficients for applying weights and phase shifts to signals for forming a beam having a beam pattern, the complex coefficients being computed using a parallelized constrained optimization algorithm to minimize a sum of a squared error between the beam pattern and a target beam pattern having a desired pointing direction and beam power; and
   (b) controlling the elements of the phased array antenna to apply the complex coefficients to signals for forming the beam having the beam pattern, wherein the complex coefficients include weights and phase values for elements of the phased array antenna.

9. The phased array antenna system as recited in claim 8, wherein the parallelized constrained optimization algorithm is a limited-memory Broyden-Fletcher-Goldfarb-Shanno algorithm with bound constraints.

10. The phased array antenna system as recited in claim 9, wherein the limited-memory Broyden-Fletcher-Goldfarb-Shanno algorithm comprises beam and beam gradient functions in matrix form to enable parallel processing within the beam steering controller.

11. The phased array antenna system as recited in claim 10, wherein the beam steering controller comprises a processing unit that uses floating point arithmetic.

12. The phased array antenna system as recited in claim 8, wherein operation (a) further comprises computing complex coefficients for adjusting the beam pattern across frequency for wideband operation.

13. The phased array antenna system as recited in claim 8, wherein operation (a) further comprises computing complex coefficients for nulling interference signals or closing a link.

14. The phased array antenna system as recited in claim 8, wherein operations (a) and (b) are implemented by the beam steering controller in real time.

15. The phased array antenna system as recited in claim 8, wherein the phased array antenna comprises a first level consisting of a multiplicity of subarray elements and a second level consisting of a multiplicity of super array elements, the complex coefficients being applied at the subarray elements and super array elements of the phased array antenna.

16. The phased array antenna system as recited in claim 8, wherein the beam steering controller further comprises a plurality of interfaces and an interface processor communicatively coupled to the beamforming processor and to the plurality of interfaces.

17. The phased array antenna system as recited in claim 16, wherein the beamforming processor is a graphics processing unit and the interface processor is a field-programmable gate array.

18. A beam steering controller comprising a beamforming processor configured to perform operations comprising:
(a) computing complex coefficients for applying weights and phase shifts to signals for forming a beam having a beam pattern, the complex coefficients being computed using a parallelized constrained optimization algorithm to minimize a sum of a squared error between the beam pattern and a target beam pattern having a desired pointing direction and beam power; and
(b) controlling elements of a phased array antenna to apply the complex coefficients to signals for forming the beam having the beam pattern, wherein the complex coefficients include weights and phase values for elements of the phased array antenna.

19. The beam steering controller as recited in claim 18, wherein the parallelized constrained optimization algorithm is a limited-memory Broyden-Fletcher-Goldfarb-Shanno algorithm with bound constraints.

20. The beam steering controller as recited in claim 18, wherein the beam steering controller further comprises a plurality of interfaces and an interface processor communicatively coupled to the beamforming processor and to the plurality of interfaces, the beamforming processor being a graphics processing unit and the interface processor being a field-programmable gate array.

* * * * *